Aug. 16, 1960   V. J. DUPLIN, JR., ET AL   2,948,948
FLY ASH RECLAMATION BY PELLETIZING
Original Filed May 19, 1949   2 Sheets-Sheet 1

INVENTORS
GEORGE B. EBERSOLE &
BY VICTOR J. DUPLIN, JR.
ATTORNEY

Aug. 16, 1960 V. J. DUPLIN, JR., ET AL 2,948,948
FLY ASH RECLAMATION BY PELLETIZING
Original Filed May 19, 1949 2 Sheets-Sheet 2

FIG. 3-A

INVENTORS
GEORGE B. EBERSOLE &
VICTOR J. DUPLIN, JR.
BY
ATTORNEY

United States Patent Office 2,948,948
Patented Aug. 16, 1960

2,948,948

FLY ASH RECLAMATION BY PELLETIZING

Victor J. Duplin, Jr., Harrisburg, Pa., and George B. Ebersole, deceased, late of Westfield, N.J., by Mabel G. Ebersole, executrix, Harrisburg, Pa., assignors to The Babcock & Wilcox Company, New York, N.Y., a corporation of New Jersey Continuation of application Ser. No. 94,184, May 19, 1949. This application Dec. 10, 1956, Ser. No. 627,971

7 Claims. (Cl. 25—156)

This invention relates to the reclamation of finely divided, normally waste, material and, more particularly to the formation of structurally stable lightweight granules or aggregates from finely divided waste material, such as fly ash, flue dust, ore dust, etc. While applicable generally to the processing of finely divided material of many types, the invention is particularly useful for the reclamation of finely divided coal ash. This application is a continuation of our copending application Serial No. 94,- 184, filed May 19, 1949, now abandoned, for Method of and Apparatus for Forming Finely Divided Material into Structurally Stable Granules.

Large capacity, pulverized coal fired boiler plants burn a large tonnage of coal daily, and the disposal of the residual ash represents a very difficult problem particularly when the latter is in a finely divided state. The ordinary pulverized coal fired furnace produces two types of ash in operation, a light finely divided "fly" ash carried out in suspension with the gaseous products of combustion, and a relatively coarse sintered "bottom" ash which falls to the bottom of the furnace and is removed through a bottom opening. The usual fly ash products contain 5% or more of unburned carbon. Its fineness and lightweight result in a difficult disposal problem, as it is readily blown away by the wind when transported and dumped, creating a nuisance, and forms quicksand when dumped in swampy ground.

The fly ash constitutes about 80% of the total ash, and has a fineness of the order of 90% through a 200 mesh screen. The particles are generally rounded and contain some cenospheres. The bottom ash constitutes about 20% of the total ash and ordinarily contains little, if any, carbon.

The trucking and dumping of the ash from a boiler plant is an expensive disposal operation which must be included in operational expense. The power plant industry has long sought for an economical method of reclaiming the ash in a salable form that will at least reduce the disposal expense.

In accordance with the present invention, economically profitable reclamation is effected by continuously pelletizing a moist mixture of the finely divided material and a suitable binder, and rapidly and intensely heating the formed pellets while the latter are still damp to form lightweight, structurally stable granules. These granules can be used as an aggregate in making concrete and the like, or can be formed into lightweight shapes for use as building partitions. The aggregate and the shapes can be sold for a competitive price sufficient to reduce substantially, and in some cases to eliminate, the ash disposal costs.

The bottom ash is screened to collect the finer particles, and these are mixed with the fly ash to form the basic raw material. This material is then mixed with a suitable cheap binder and/or including a glaze-forming element and formed into moist pellets having sufficient mass to avoid sticking when the damp pellets are highly heated for a short time in a hot reaction chamber. The heating burns out the carbon constituents, generating gaseous products of combustion which expand the pellets to form voids and pores, while fusing the glaze-forming element to form a glaze on the surface of the expanded pellets. The resultant granules are then annealed to increase their strength, after which they may be used as an aggregate or formed into lightweight shapes (about 40 lbs./cu.ft.) which may be used for sound insulation or for partitions. The coarse material separated from the bottom ash is passed directly to the finished granule stage. The binder also acts to lower the fusion temperature of the entire pellet, so that the intense rapid heating at a predetermined high temperature also effects at least incipient fusion of the ash.

In one form of apparatus for practicing the invention method, the basic material is placed in a suitable proportioning mixer where it is thoroughly admixed with a moist binder preferably having a glaze-forming constituent with a fusion temperature lower than that of the raw material. The dampened mixture is discharged into an elongated inclined rotating tube, which cascades the mixture to form substantially spherical, damp pellets having substantial strength and stability. The tube is preferably heated for at least its initial section to quickly remove sufficient moisture from the mixture to prevent excessive sticking to the tube surface to assist the pelletizing.

At the discharge end of the pelletizing tube, the pellets are screened as to size, and fines and undersized pellets are returned to the mixer for recycling. The still damp pellets above a predetermined size are fed into a rotating kiln, where the damp pellets are quickly heated to a high temperature to burn out the carbon, drive off the entrapped moisture and gases, and fuse the binder to surface glaze the pellets. The heating also effects at least incipient fusion of the ash. Due to their substantially spherical shape, to the viscous envelope, and to their mass, the pellets easily tear themselves away from the kiln surface, preventing sticking and the formation of a ring in the kiln. The quick, intense, heating transforms the pellets into sintered, structurally stable, lightweight granules having a multiplicity of interior voids due to the burning out of the carbon and expulsion of the gases formed by heating of the binder constituents. These granules are then slowly annealed in a suitable chamber to improve their strength and toughness.

With the foregoing in mind, it is an object of the present invention to provide a method of an apparatus for usefully reclaiming previously wasted finely divided material.

Another object is to provide a novel method of an apparatus for forming structurally stable granules for use in building materials.

A further object is to provide a new lightweight aggregate and new lightweight construction shapes.

These, and other objects, advantages and novel features of the invention will be apparent from the following description and the accompanying drawings. In the drawings:

Fig. 3A is a diametric sectional view of the pelletizing tube shown in Fig. 3.

Figure 1:
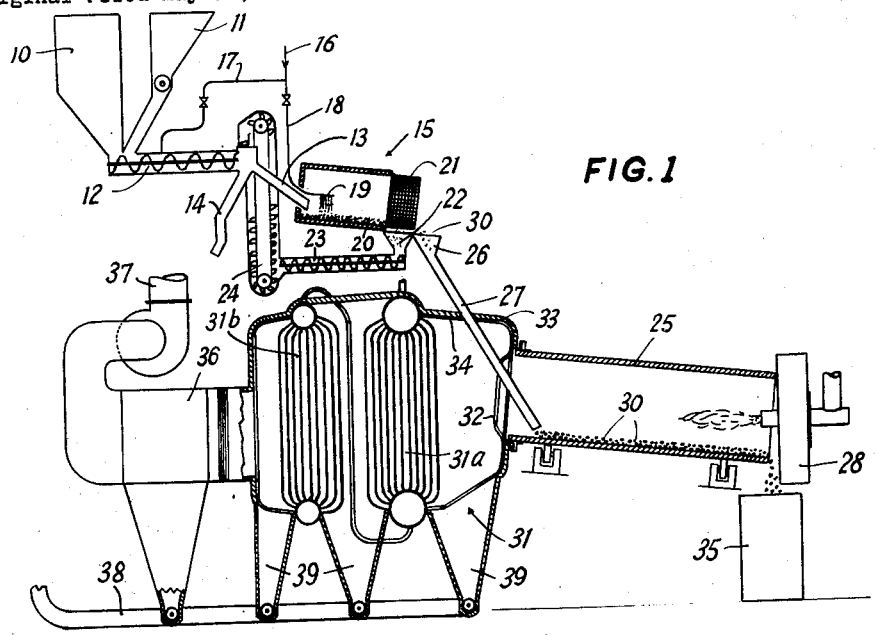
Fig. 1 is a side elevation view, partly in section, schematically illustrating one form of apparatus with which the invention may be practiced.

A feature of the present invention is the formation of the finely divided material and a binder into damp pellets, which, while still damp, are subjected to a short, rapid and intense heating. This effects the formation of structurally stable well knit pellets or granules within a definite size range to avoid excesive expense of crushing the finished product, and the pelletization controls the size of the feed to the heating apparatus to avoid dust therein or an excesive quantity of undersized pellets or granules. Additionally, in the damp pellet form, the material can be rapidly and intensely heated by passage through a short length hot furnace or kiln without sticking of the material to the walls of the furnace or kiln, the formed pellets having sufficient mass and internal coherence that they easily break away from the furnace or kiln walls. To accomplish these results, the pelletizing operation provides for thorough admixing of the finely divided material with a moist binder, or with a dry binder and the adidtion of moisture, both preferably having a glaze-forming constituent, which allows such intense rapid heating of the pellets without disintegration and reduces to a minimum the escape of dust from the heating apparatus.

The initial or raw material may be any finely divided, normally waste substance, such as ash from coal fired boiler furnaces or dust from any processing operation, such as blast furnace flue dust, ores, etc. To provide for adequate pelletization, the fineness of the material is limited to substantially not more than 20% passing through a ⅛ mesh, in the case of fly ash, and the balance to be 80% to 90% passing through a 200 mesh screen. For best results, it is preferred that all the material pass a 200 mesh screen. In the case of fly ash, the carbon content supplies part of the heat and assists in the bloating or expansion of the pellets to form voids and pores therein. While not limited thereto in any way, the invention will, for purposes of illustrating a specific application, be described as applied to the reclamation of such ash.

Fly ash has a typical composition as follows:

| | Percent |
|---|---|
| $SiO_2$ | 45–50 |
| $Al_2O_3$ | 27–35 |
| $Fe_2O_3$ | 6–14 |
| C | 4–12 |
| CaO | 2–3 |
| Miscellaneous | 9 |

The ash, after having been screened as to size, is mixed with a suitable binder either before or during the pelletizing step to form a moist mixture. The material added as a binder and/or expander is preferably one having solid glaze-forming constituents having a fusion temperature substantially lower than the relatively high fusion temperature of the ash. Thereby, the binder is fused during the rapid intense heating step to quickly form a viscous glaze or envelope on the pellets, binding or cementing the latter against disintegration due to the subsequent expulsion of the internal gases and burning of any pellets so that the heating effects at least incipient fusion of the ash. The binder also lowers the fusion temperature of the parent material. The primary purpose of the binder is to assist the ash to pelletize and to retain the pellet shape when the latter is dropped into the heating apparatus.

The following materials are suitable as binders and expanders: Clays, such as bentonite or suitable local ball clays, limestone, Semet Solvay waste, sodium chloride, combinations of Semet Solvay waste and sodium chloride, pulverized pyrites and slate rejected from coal pulverizers (which substances are also a source of fuel), water, borax, soda ash, aluminum sulphate, sodium sulphate, calcium sulphate, calcium chloride, plaster of Paris, sodium carbonate, calcium carbonate, boric acid, and various organic binders, such as dextrine, starch, flour, sulphite liquor waste and wood flour. All the above materials act both as binders and expanders, and all of these materials, except the water and the organic binders, are glazed formers.

By the term "Semet Solvay" waste as used herein is meant a material having substantially the following compositions:

| | Parts |
|---|---|
| $H_2O$ | 57.0 |
| $CaCO_3$ | 26.0 |
| CaO | 4.0 |
| MgO | 0.5 |
| $CaCl_2$ | 4.0 |
| $CaSO_4$ | 1.5 |
| NaCl | 1.25 |
| $SiO_2$ | 5.00 |
| $Fe_2O_3$ | } 5.00 |
| $Al_2O_3$ | |

During the processing according to this invention, the carbon burns out and, with the addition of Solvay waste and salt (NaCl), more lime (from the Solvay waste) and alkali ($Na_2O$) are added. Both of these are fluxes which lower the fusion temperature and thus allow the mass to sinter and develop strength at a lower temperature. The amount added is sufficient to effect sintering of the mass at the prefered firing temperature which is of the order of 2200° F.

During the treatment, the sulphates and carbonates decompose into oxides and evolve gases which assist bloating of the mass (for low density) when the pellet surface is sealed with a glaze or glass. As the gases developed within the envelope tend to expand the mass, it is advantageous to heat the pellets rapidly to seal the surface quickly.

The salt (NaCl) melts at 1472° F. and tends to vaporize at 2200° F. This salt reacts with the ash to produce a typical "salt glaze" condition, and also to form a glassy silicate at and above the salt melting point. The lime and alkalies from the Solvay waste tend to form glass silicates of the soda-lime type, and also lower the fusion temperature.

The ash and the binder may be premixed either by dry mixing or by wet mixing. The latter is preferred due to the decreased dusting and better control afforded thereby. In dry mixing, the ash and the binder may be fed by a proportioning hopper, poidometers, or vibrating feeders into a continuous pug mill, or may be mixed by a dry batch process in a ribbon type mixer and discharged into a hopper from which the mixture is fed to the pelletizer at a controlled rate.

There are several methods by which the ash and the binder may be wet mixed. In one method, the mixture is wetted by a spray as it passes through a pug mill type mixer. In another method, described more fully hereinafter, the ash and binder are mixed directly in the pelletizing tube by feeding the dry ingredients thereto at a controlled rate and spraying the dry mixture with a controlled water spray while rotating the tube. Other suitable wet mixing methods involved mixing the ash and binder with water in a rotating drum and feeding the mixture directly into the forming tube, or mixing the ash and binder with a predetermined quantity of water in a rotating drum followed by pelletizing the mixture directly in the mixer.

The preferred method of pelletizing is to feed the damp mixture into a rotatable cylindrical pelletizing tube which has an inclination which can be varied, but which is preferably maintained at about 3%. The pelletizing tube is externally heated for its initial section, for example for about ⅓ the distance from its entrance, and a quantity of air is passed through the tube to remove moisture depositing on the tube as the damp material is cascaded through the tube to form pellets.

The operation is shown, as a whole, in Fig. 1 of the drawings, wherein bins 10 and 11 are shown as arranged to receive the ash and the binder, respectively. The two materials are fed from the bins by proportioning feeders (not shown) so that the correct proportions of raw material and binder are delivered to a mixer feeder 12. The latter delivers the mixed material to a discharge chute 13 extending into the feeding end of a pelletizing tube 15. A by-pass chute 14 is provided for receiving the material when the pelletizing apparatus is out of service for repairs or maintenance, for example.

A water line 16 is provided for furnishing the mixing water for wet mixing, and water may be fed to mixer feeder 12 through branch 17, or to tube 15 through branch 18 and spray head 19. The water from branch 17 may be used to mix with clay, when the latter is used as a binder, or a convert the usual filter cake of Semet-Solvay waste into a pumpable slurry, which is used as a binder for mixing with the raw material.

As the mixture is discharged into tube 15, a thin coating is formed on the inside of the tube, such coating being limited in thickness by a scraper, or the like, as described hereinafter. Additionally, heating of the tube 15, in a manner described hereinafter, and passing of air therethrough, assist in limiting the thickness of the coating. Friction between the damp material and the coated tube is sufficient to cause the material to cascade as tube 15 is rotated, and due to the inclination of the tube. As the mixture 20 cascades upon itself, it rolls into substantially spherical pellets 30 of varying sizes.

At the discharge end of tubes 15, a rotatable screen 21 receives the damp pellets discharged from tube 15 as well as any unpelletized material 20. The pellets below a predetermined size, as well as any unpelletized material, pass through screen 21 into a hopper 22 leading to a horizontal conveyor 23. A vertical conveyor 24 receives material from conveyor 23 and carries it to the entrance of discharge chute 13 for recycling through pelletizing tube 15.

The formed pellets 30 equal to or greater than such predetermined size are passed over screen 21 to a hopper 26 having a discharge tube 27 leading to a rotary furnace or kiln 25. Immediately upon their entrance into kiln 25, the pellets are quickly highly heated causing a substantially instantaneous evaporation of moisture. As the moisture moves to the surface of the pellets, it carries with it the binder glaze-forming constituents which are in solution, and these constituents, as they approach or reach the highly heated pellet surface, melt. The glaze-forming constituents originally at the surface also melt. This melting provides a viscous envelope for the pellets, consisting of melted glaze-forming constituents interconnecting ash particles. This viscous envelope is semi-fluid.

As the heating of the pellets continues, the carbon content of the ash burns out providing additional heat and producing voids having nearly the same volume as the unburned carbon, and chemical reactions occur in the binder constituents evolving gases. Some of this carbon burning and chemical reaction takes place at the pellet surface, as well as internally. The resulting gases are driven off through the viscous surface envelope, forming a multitude of interconnected voids and surface pores, so that a porous cellular structure results. The steam from the evaporated moisture also takes part in the void and pore formation.

Further heating of the pellets results in at least incipient fusion of the ash particles and the transformation of the glaze-forming binder constituents into a glass like structure interconnecting and bonding the ash particles and forming enclosures for the voids. The viscous surface envelope likewise becomes glassy. During this time, the pellets roll along the kiln wall and the surface envelope, in combination with the mass and substantially spherical shape of the pellets, assists the pellets in tearing themselves loose from the kiln wall. The resultant structurally stable lightweight granules are discharged into an annealing pit or chamber 35 where the granules are slowly annealed to increase their strength and toughness.

The action of the glaze-forming materials in solution in the binder appears to be as follows. When the pellets are rapidly and intensely heated, the water is driven out of the pellets at a high rate. As soon as most of the water is gone, the water soluble material is transported close to the pellet surface, and some of the material at the surface melts. The surface tension of the melted material holds the fly ash particles together until the pellet surface temperature is sufficiently high to form a ceramic bond.

Kiln 25 is heated by a suitable fluid fuel burner 28 at its discharge end. To improve the heat economy of the apparatus, the hot gases from kiln 25 are utilized in a steam boiler unit 31 comprising a boiler 31a and an economizer 31b and having a row of screen tubes 32 across the gas exit from kiln 25 which, together with roof 33 and roof tubes 34, support discharge spout 27. Spout 27 is thus highly heated which assists in preventing the damp pellets 30 sticking therein while being discharged to kiln 25. The gases from boiler 31 pass through a dust collector 36 to a stack 37. Dust collector 36 discharges into a conveyor 38 which also receives material from the hoppers 39 of boiler 31. Conveyor 38 returns the collected material to hopper 10 for recycling. Best results are obtained when the pellet surface temperatures in the kiln range from about 1900° F. to about 2250° F., with the ideal temperature dependent upon the particular binder, as will be noted in the examples appearing hereinafter.

In the operation of the apparatus of Fig. 1, all material less than about 4-mesh is recycled. If pellets fed to kiln 25 are too small in size, they tend to stick to each other and to the kiln walls forming a ring which prevents free pellet flow through the kiln and which must be broken up to restore the pellet flow. This excessive agglomeration in the kiln, characteristic of undersized pellets, determines the lower size limit of the pellets fed to kiln 25. On the other hand, pellets which are too large in size are not satisfactorily bonded in the kiln due to the limitations of the available heating time in a continuous process. Consequently, the upper size limit of the pellets is determined by the thermal conductivity of the pellets and the available heating time in kiln 25. The oversized pellets may be rejected by a suitable screen in advance of the kiln entrance. By recycling the fines and undersized pellets, these may be built up to the desired minimum size.

The desired form of furnace 25 is a short kiln of large diameter with a relatively steep slope and rotated at a relatively high speed to move pellets 30 quickly through the kiln. The pellets must have sufficient strength to avoid breakage when fed to kiln 25, and the pellet temperatures must be quickly raised to a temperature sufficient to effect surface glazing of the pellet to avoid drying and disintegration into dust. This dust will cling to the kiln surface, forming a ring, which effect is also caused if too high a percentage of small pellets is admitted to the kiln.

The nature and composition of fly ash is such that, when mixed with a binder and intensely heated at the temperature present at the entrance to kiln 25, an amorphous glass will be developed in the structure of the granule as described hereinabove, particularly when glass-forming binder constituents are present. If the granules are not cooled slowly, the incipiently fused ash will be brittle and develop numerous fine cracks tending to decrease its strength. Consequently, the hot granules 30 discharged from kiln 25 must be cooled slowly in pit or chamber 35 in a manner similar to the annealing of glass.

While many types of binders are suitable, the following examples will serve to illustrate typical mixtures which have proved successful in practice.

Example I

| | Parts |
|---|---|
| Fly ash | 80 |
| Bottom ash | 20 |
| Salt (NaCl) | 5 |
| Water | 20 |

The materials were wetted and agitated to form the pelletizing mixture. The formed pellets were intensely heated in the kiln at a pellet surface temperature of about 2125° F. to form a "sausage" of adhering pellets. There was no disintegration or "dusting," and acceptable structurally stable granules were obtained. The kiln temperatures in this and in the following examples were approximately 150° F. higher than the pellet surface temperatures.

Example II

| | Parts |
|---|---|
| Fly ash | 80 |
| Bottom ash | 20 |
| Semet Solvay waste (see analysis above) | 5 |
| Salt (NaCl) | 5 |
| Water | 20 |

These materials were mixed as in Example I, pelletized and fed to the kiln. At about 1900° F. pellet surface temperature, there was no disintegration or "dusting" in the kiln and, at about 2260° F., the pellets formed a "sausage." Acceptable, structurally stable, lightweight granules were obtained. It is to be noted, from the composition given above, that Semet Solvay waste is a source of lime.

Example III

| | Parts |
|---|---|
| Fly ash | 80 |
| Bottom ash | 20 |
| Semet Solvay waste (see analysis above) | 5 |
| Water | 25 |

When these materials were mixed and pelletized, hard firm pellets were formed. When these pellets were fed to the kiln and quickly heated to about 2200° F. pellet surface temperature, they exploded. The explosive disintegration of the pellets stopped when the pellet surface temperature at the kiln entrance was lowered to about 1975° F. with the pellet feeding being continued. At about 2020° F. pellet surface temperature, the pellets rolled freely in the tube but, when the temperature was increased to about 2160° F., the pellets began to become sticky. Lowering the pellet surface temperature to about 2070° F. restored the free rolling of the pellets, and commercially satisfactory, structurally stable granules were produced.

Figure 2:
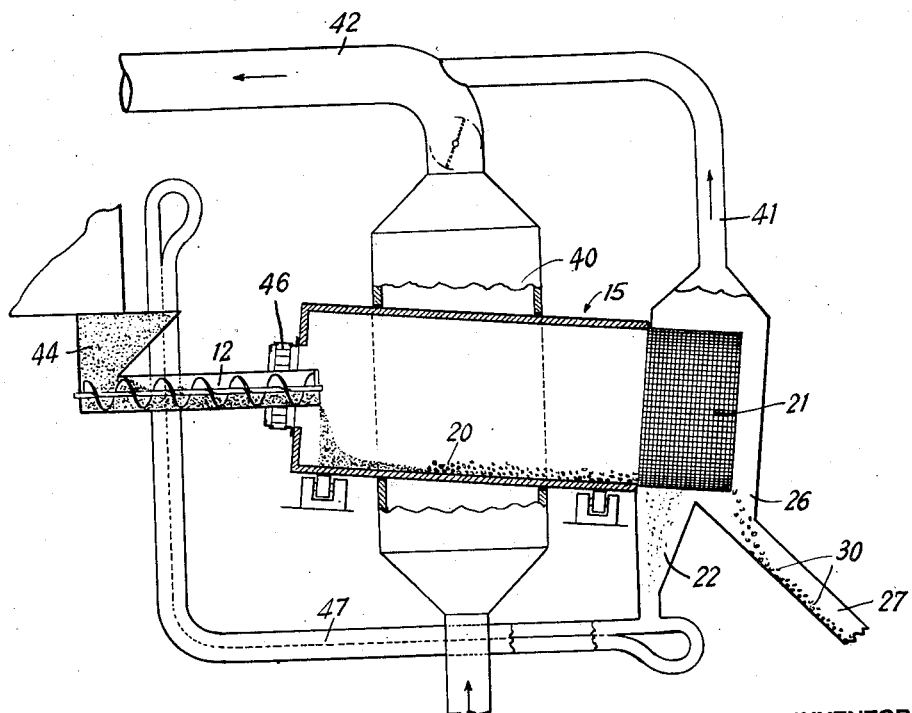
Fig. 2 is a view similar to Fig. 1 showing a modified pelletizing arrangement.

To prevent excessive building up of the mixture on the surface of pelletizing tube 15, it has been found that heating tube 15, in combination with the use of an interior scraper, is effective. One effective way of providing such heating is shown in Fig. 2, wherein tube 15 is heated by hot boiler gases induced to flow upwardly through a heating chamber 40 surrounding tube 15, by the fan 37 of dust collector 36. Cold air is drawn through tube 15, to remove excess moisture, by a bypass 41 connected to the discharge end of tube 15 and leading to discharge end of conduit 42.

In this case, the raw material and the binder are fed to a hopper 44 discharging into mixer feeder 12 which feeds the mixture directly to tube 15 through an entrance grating 46. The rejected fines from screen 21 and hopper 22 are returned to hopper 44 through the medium of a bulk conveyor 47. Except for the described differences, the apparatus is otherwise the same as that of Fig. 1 although it may be used with equal facility with the stack for the main furnace or furnaces of a boiler plant.

Figure 3:
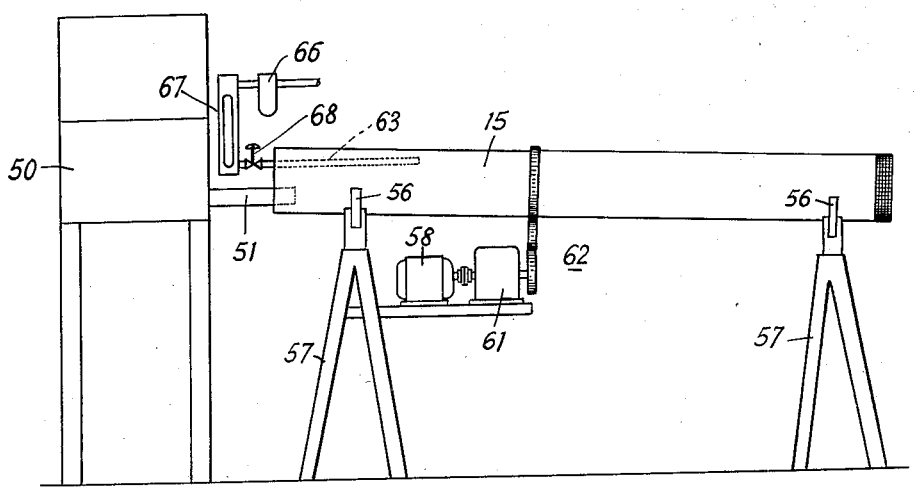
Figs. 3 and 4 are side-elevation views of different arrangements of pelletizing tubes.

Fig. 3 illustrates, in somewhat greater detail, the support and driving arrangement for pelletizing tube 15, and a mixture feeding arrangement therefor. The particular tube shown in this figure is an 18 inch sheet metal tube, 14 feet long and having a 3° 30′ slope. The tube 15 is mounted on rollers 56 on supports 57, and is driven by a motor 58 through a speed changer 61 and gearing 62, at approximately 30 to 50 r.p.m.

In Fig. 3 the dry materials are mixed in proportioning hopper 50 and fed through pipe 51. A water spray pipe 63 extends into tube 15 and is supplied with water from a pipe 64 through a filter 66, a rotameter 67 and a control valve 68. As seen in Fig. 3A, a longitudinally arranged elongated scraper 69 is provided to keep the internal coating of the tube at a predetermined optimum thickness.

In this case, the dry materials are subjected to a fine water spray within the initial length of the tube. The water droplets form small pellets as they fall into the dry material, and these pellets are enlarged and compacted as they cascade through the length of the tube. The water spray method of Fig. 3 requires critical control of both the water spray and the dry feeding of the mixture. The spray must be so located that all the droplets fall into the tumbling bed of fly ash, as, if the spray wets the tube wall, a quantity of fly ash will adhere to the wall and eventually become too wet.

Figure 4:
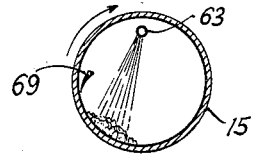
Figure 4:
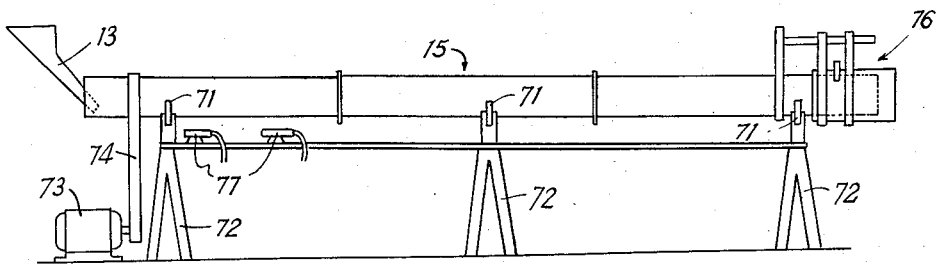

A preferred form of pelletizing tube 15′ is shown in Fig. 4 as being considerably longer than the tubes of Figs. 1 and 3. Tube 15′, may be, for example, an 18 inch diameter, 3 section, steel tube, 30 feet long and having a pitch of 1 inch in 6 feet. Tube 15′ is supported on rollers 71 on supports 72, and a motor 73, through a belt drive 74, rotates the tube at about 51 r.p.m. At the discharge end, rotating screens 76 separate the pellets ranging from 8 mesh to ½ inch for firing in the kiln. The finer pellets and the unpelletized material are recycled. Tube 15′ is fed with a wet mix through discharge pipe 13, and the first 10 foot section of the tube is heated by suitable means, schematically indicated as gas burners 77 although other heating arrangements, such as that of Fig. 2, may be used. A stream of air is introduced through the tube by means of a forced draft fan at the discharge end (not shown) to remove moisture from the tube surface. The pellets produced are superior to those produced by the pelletizing tube arrangement of Figs. 1 and 3, although these latter produce commercially satisfactory granules.

Incipient fusion of the ash is effected more readily in a kiln having a controlled atmosphere, which is preferably reducing in nature, and controlled temperatures throughout its length. By control of these factors, particularly the temperature, the density of the granules may be closely controlled in accordance with desired values of expansion or of density. For example, if the kiln temperatures are maintained sufficiently high, the ash may be fused to a greater extent to provide a harder and more dense fused, glass-like structure. With the pellet surface temperature values given in the foregoing examples, an expanded, lightweight, low density product is produced.

An even greater degree of bloating or expansion of the pellets can be obtained by subjecting the latter to additional sudden intense heating as the granules are discharged from the kiln. Such additional heating may be effected by arranging another burner so as to produce a short highly heated zone at the discharge end of the kiln. Control of the kiln atmosphere and temperatures gives a control of the color of the granules so that a commercially satisfactory product, from the color standpoint, is provided.

An approximate analysis of the final product is as follows:

| | Percent |
|---|---|
| $SiO_2$ | 48.0 |
| $Al_2O_3$ | 30.2 |
| $Fe_2O_3$ | 5.9 |
| CaO | 4.2 |
| Alkalies and miscellaneous | 11.7 |

With the described process, the formed pellets retain their identity and are expanded to provide the multicellular structure while the visous envelope formed by the surface glaze is still in a semi-molten state. Nevertheless, the pellets retain sufficient mass to break away from the kiln lining and progress toward the discharge end. Since the pellets are substantially spherical, their areas of contact with the kiln or adjacent pellets are limited, which facilitates the break away and inhibits undue agglomeration. However, to assure these desirable effects, close control of the pellet size is necessary.

As a specific example of results achieved by the present invention, granules produced by the described process have been crushed and used as an aggregate to form a "cinder" block of the usual hollow type having, for example, 4 webs defining three compartments. A low ratio cement mixture, comprising 8 parts of crushed granule aggregate to one part of cement, produced an 8"x8"x15" block having a weight of 26½ lbs. and a crushing strength of 800 lbs., the block density being about 53 lbs./cu. ft. This crushing strength compares with a value of 690-700 lbs. for the same size and type of block produced from prior art aggregates. The weights may range from 26 to 27 lbs., and the densities from 50 to 55 lbs./cu. ft., although this range may be made 40 to 60 lbs with proper additions and firing control.

While specific embodiments of the invention have been shown and described in detail to illustrate the application of the invention principles, it should be understood that the invention may be embodied otherwise without departing from such principles.

What is claimed is:

1. For use in an aggregate for forming a low density structural shape, burned lightweight granules each consisting of coal ash bonded by a glaze forming binder containing NaCl and having a fusion temperature lower than that of the coal ash, each granule consisting of from 80 to 100 parts by weight of coal ash glazed and bonded 5 parts by weight of such binder; the binder before burning having the following composition by weight:

| | Parts |
|---|---|
| $H_2O$ | 57.0 |
| $CaCO_3$ | 26.0 |
| CaO | 4.0 |
| MgO | 0.5 |
| $CaCl_2$ | 4.0 |
| $CaSO_4$ | 1.5 |
| NaCl | 1.25 |
| $SiO_2$ | 5.00 |
| $Fe_2O_3$ | } 5.00 |
| $Al_2O_3$ | |

2. A method of agglomerating finely divided particles containing combustible matter, to form an aggregate, comprising, in combination, providing a moist mixture of the particles and a binder including a water soluble glaze-forming constituent forming a ceramic glaze when heated to a temperature in excess of 2000° F.; forming the damp mixture into pellets; and, in a single, continuous and uninterrupted operation rapidly and intensely heating the damp pellets to a pellet surface temperature of at least 2000° F. to generate steam from the moisture with the water soluble glaze-forming constituent carried toward the surface of the pellets and to burn out the combustible matter within the pellets while fusing the binder to bond the particles and form a ceramic glaze on the surface of the pellets, to form structurally stable low density granules having a multiplicity of voids therein.

3. A method as claimed in claim 2 in which the pellets are heated in a reducing atmosphere.

4. A method as claimed in claim 2 in which the binder has a fusion temperature lower than that of the particles.

5. A method as claimed in claim 2 in which the binder includes sodium chloride.

6. A method as claimed in claim 2 in which the binder includes sodium chloride and lime.

7. A method as claimed in claim 2 in which the particles are fine ash including fly ash.

References Cited in the file of this patent

UNITED STATES PATENTS

| | | |
|---|---|---|
| 1,741,574 | Kraus | Dec. 31, 1929 |
| 1,967,311 | Kern | July 24, 1934 |
| 2,268,816 | Gabeler et al. | Jan. 6, 1942 |
| 2,478,757 | Foster | Aug. 9, 1949 |
| 2,543,898 | De Vaney | Mar. 6, 1951 |

UNITED STATES PATENT OFFICE
CERTIFICATION OF CORRECTION

Patent No. 2,948,948            August 16, 1960

Victor J. Duplin, Jr., et al.

It is hereby certified that error appears in the above numbered patent requiring correction and that the said Letters Patent should read as corrected below.

In the grant, lines 1 and 2, for "Harrisburg, Pennsylvania," read -- Fanwood, New Jersey, --; in the heading to the printed specification, line 3, for "Harrisburg, Pa.," read -- Fanwood, N. J., --; column 5, line 16, for "or a" read -- or to --.

Signed and sealed this 25th day of April 1961.

(SEAL)
Attest:

ERNEST W. SWIDER
Attesting Officer

DAVID L. LADD
Commissioner of Patents